United States Patent
Kuo

(10) Patent No.: US 12,185,398 B2
(45) Date of Patent: Dec. 31, 2024

(54) METHOD AND APPARATUS FOR UU RADIO BEARER TO PC5 RADIO LINK CONTROL (RLC) BEARER MAPPING IN A WIRELESS COMMUNICATION SYSTEM

(71) Applicant: ASUSTek Computer Inc., Taipei (TW)

(72) Inventor: Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 347 days.

(21) Appl. No.: 17/518,934

(22) Filed: Nov. 4, 2021

(65) Prior Publication Data
US 2022/0159753 A1 May 19, 2022

Related U.S. Application Data

(60) Provisional application No. 63/114,158, filed on Nov. 16, 2020.

(51) Int. Cl.
*H04W 72/08* (2009.01)
*H04W 72/1263* (2023.01)
(Continued)

(52) U.S. Cl.
CPC ....... *H04W 76/14* (2018.02); *H04W 72/1263* (2013.01); *H04W 92/18* (2013.01)

(58) Field of Classification Search
CPC ..... H04W 76/27; H04W 76/11; H04W 76/14; H04W 8/24; H04W 4/46; H04W 8/005;
(Continued)

(56) References Cited

U.S. PATENT DOCUMENTS 10,602,550 B2   3/2020  Burbidge et al.
11,050,535 B2*  6/2021  Cheng .................. H04W 76/14
(Continued)

FOREIGN PATENT DOCUMENTS

CN   107453885 A   12/2017
CN   108391285 A   8/2018
(Continued)

OTHER PUBLICATIONS

HiSilicon Huawei: "Study Aspects of UE-to-Network Relay and Solutions for L2 Relay", 3GPP TSG-RAN WGI Meeting #111-e, R2-2008047, Online, Aug. 17-28, 2020, 12 pages.
(Continued)

*Primary Examiner* — Jung Liu
(74) *Attorney, Agent, or Firm* — Cooper Legal Group LLC

(57) ABSTRACT

A method and device are disclosed for Uu radio bearer to Sidelink (SL) Radio Link Control (RLC) mapping. In one embodiment, the method includes a network node transmitting a Radio Resource Control (RRC) message to a relay User Equipment (UE), wherein the RRC message includes a first information indicating a mapping which represents an association between a Uu radio bearer and a SL RLC bearer and wherein the RRC message also includes a second information identifying a remote UE associated with the mapping. The method further includes the network node transmitting an adaptation layer Protocol Data Unit (PDU) to the relay UE, wherein a header of the adaptation layer PDU includes an identity of the Uu radio bearer and a local UE identifier of the remote UE.

20 Claims, 11 Drawing Sheets

(51) Int. Cl.
*H04W 76/14* (2018.01)
*H04W 92/18* (2009.01)

(58) Field of Classification Search
CPC ......... H04W 4/40; H04W 4/44; H04W 48/16; H04W 36/03; H04W 92/18; H04W 88/04; H04W 72/1263; H04W 40/22; Y02D 30/70
See application file for complete search history.

(56) References Cited

U.S. PATENT DOCUMENTS

| | | | | |
|---|---|---|---|---|
| 11,711,785 | B2* | 7/2023 | Rao ................... | H04W 72/23 370/329 |
| 2020/0163005 | A1* | 5/2020 | Rao ................... | H04W 76/27 |
| 2021/0105787 | A1* | 4/2021 | Park .................. | H04L 43/16 |
| 2021/0329487 | A1* | 10/2021 | Wang ................. | H04W 28/24 |
| 2022/0015070 | A1* | 1/2022 | Chen ................. | H04W 72/23 |
| 2022/0022279 | A1* | 1/2022 | Kim ................... | H04W 72/23 |
| 2022/0053519 | A1* | 2/2022 | Akkarakaran .... | H04W 72/1263 |
| 2022/0272670 | A1* | 8/2022 | Ji ....................... | H04W 72/0453 |
| 2022/0346112 | A1* | 10/2022 | Lin .................... | H04W 72/1263 |
| 2023/0073469 | A1* | 3/2023 | Wang ................ | H04W 72/1263 |
| 2023/0074899 | A1* | 3/2023 | Wang ................ | H04W 36/0016 |
| 2023/0180313 | A1* | 6/2023 | Freda ................ | H04W 76/14 370/310 |
| 2024/0031877 | A1* | 1/2024 | Ji ....................... | H04W 36/0033 |

FOREIGN PATENT DOCUMENTS

| | | |
|---|---|---|
| CN | 108886682 A | 11/2018 |
| CN | 111901847 A | 11/2020 |
| WO | 2018028504 A1 | 2/2018 |
| WO | 2018141294 A1 | 8/2018 |
| WO | 2018171540 A1 | 9/2018 |

OTHER PUBLICATIONS

CATT: "User and Control Plane Procedures for L2—UE-to-NW Relay", 3GPP TSG-RAN WG2 Meeting #111-e, R2-2006610, Electronic, Aug. 17-28, 2020, 7 pages.
Corresponding Korean Patent Application 10-2021-0150257, Office Action dated Jun. 25, 2024, 7 pages, English Translation.
Corresponding Chinese Patent Application No. 2021-11302514.9, Office Action dated May 22, 2024, 28 pages w/ English Translation.
Hisilicon, Huawei: Summary of email discussion [95bix#15][LTE/FeD2D] Bearer modelling and adapation layer, 3GPP TSG-RAN WG2 #96, R2-167883, Reno, Nevada USA, Nov. 14-18, 2016, 7 pages.
Liu Yuming: "Research and Design of Key Technologies for Physical Layer to 5G V2X Standardization", Thesis for Master Degree, Full Text Library, Sep. 15, 2019, 86 pages.
Dawid Koziol, et al.: "QoS and Service Community in 3GPP D2D for IoT and Wearables", 2017 IEEE Conference on Standards for Communications and Networking (CSCN), 7 pages.

* cited by examiner

METHOD AND APPARATUS FOR UU RADIO BEARER TO PC5 RADIO LINK CONTROL (RLC) BEARER MAPPING IN A WIRELESS COMMUNICATION SYSTEM

CROSS-REFERENCE TO RELATED APPLICATIONS

The present Application claims the benefits of U.S. Provisional Patent Application Ser. No. 63/114,158 filed on Nov. 16, 2020, the entire disclosure of which is incorporated herein in its entirety by reference.

FIELD

This disclosure generally relates to wireless communication networks, and more particularly, to a method and apparatus for UU radio bearer to PC5 RLC bearer mapping in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for Uu radio bearer to Sidelink (SL) Radio Link Control (RLC) mapping. In one embodiment, the method includes a network node transmitting a Radio Resource Control (RRC) message to a relay User Equipment (UE), wherein the RRC message includes a first information indicating a mapping which represents an association between a Uu radio bearer and a SL RLC bearer and wherein the RRC message also includes a second information identifying a remote UE associated with the mapping. The method further includes the network node transmitting an adaptation layer Protocol Data Unit (PDU) to the relay UE, wherein a header of the adaptation layer PDU includes an identity of the Uu radio bearer and a local UE identifier of the remote UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.303 V16.0.0, "Proximity-based services (ProSe); Stage 2 (Release 16)"; TR 23.752 V0.5.0, "Study on system enhancement for Proximity based services (ProSe) in the 5G System (5GS) (Release 17)"; TS 23.502 V16.5.1, "Procedures for the 5G System (5GS); Stage 2 (Release 16)"; TS 38.331 v16.1.0, "NR; Radio Resource Control (RRC) protocol specification (Release 16)"; and R2-2008047, "Study aspects of UE-to-Network relay and solutions for L2 relay", Huawei, HiSilicon. The standards and documents listed above are hereby expressly incorporated by reference in their entirety.

Figure 1:
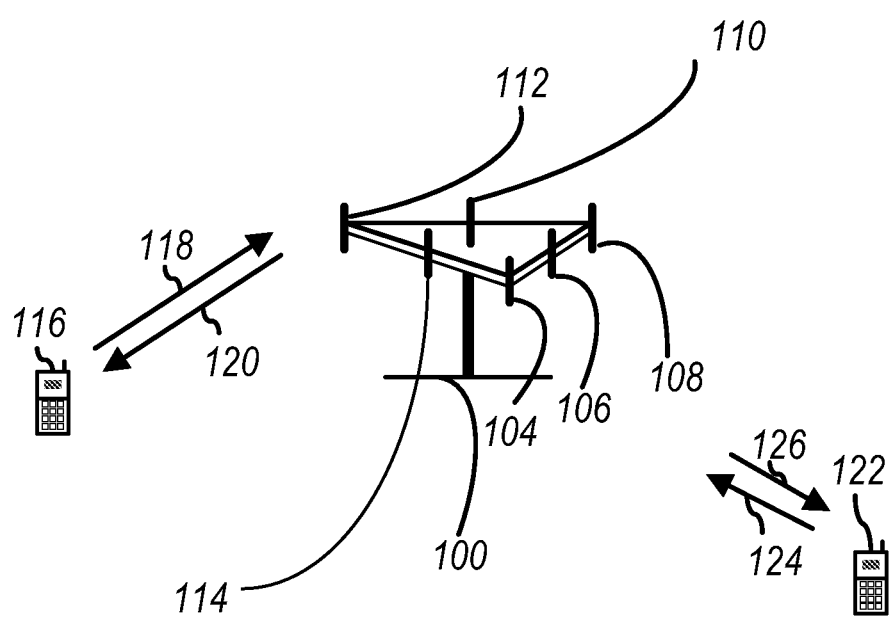
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
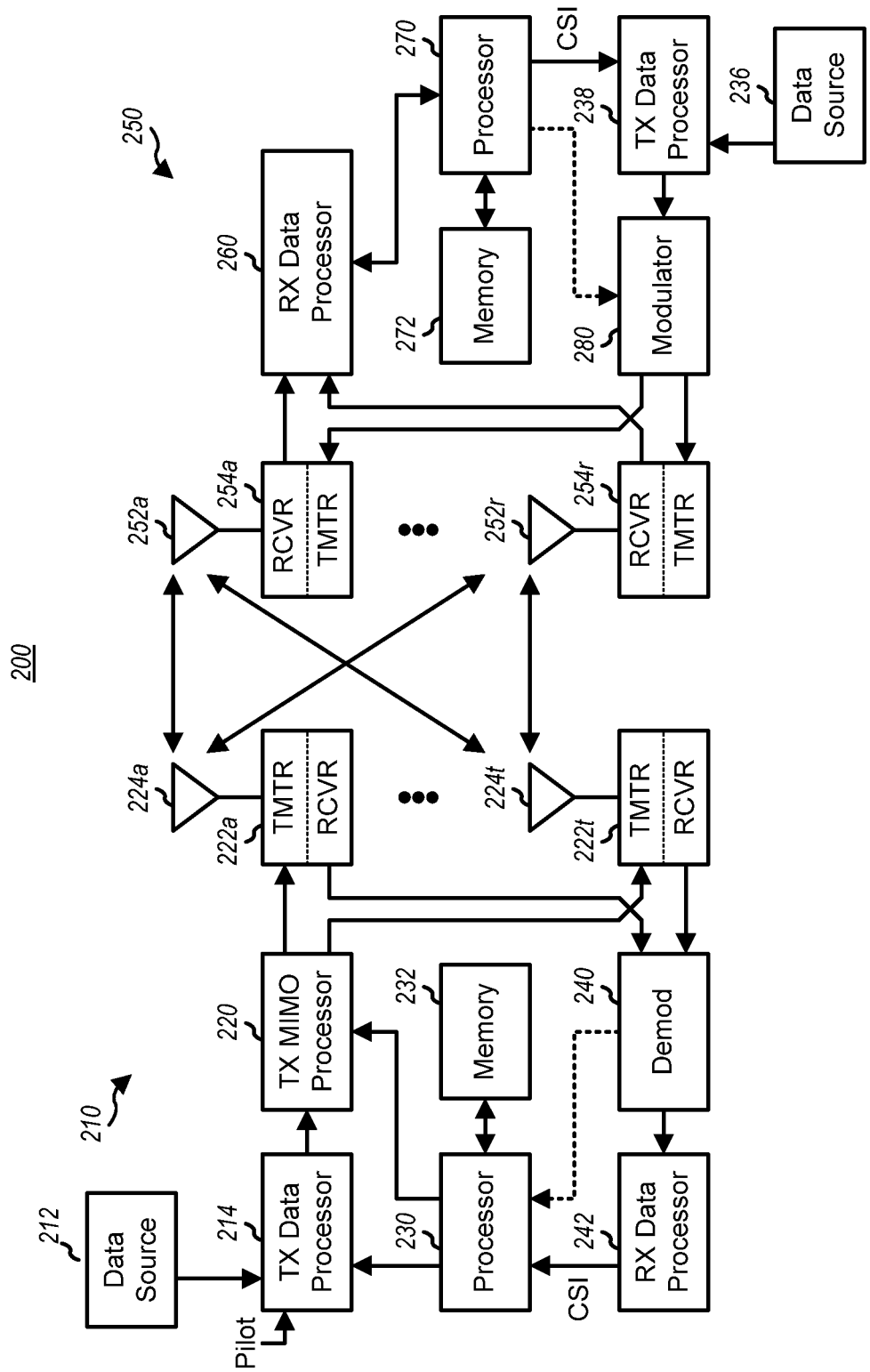
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
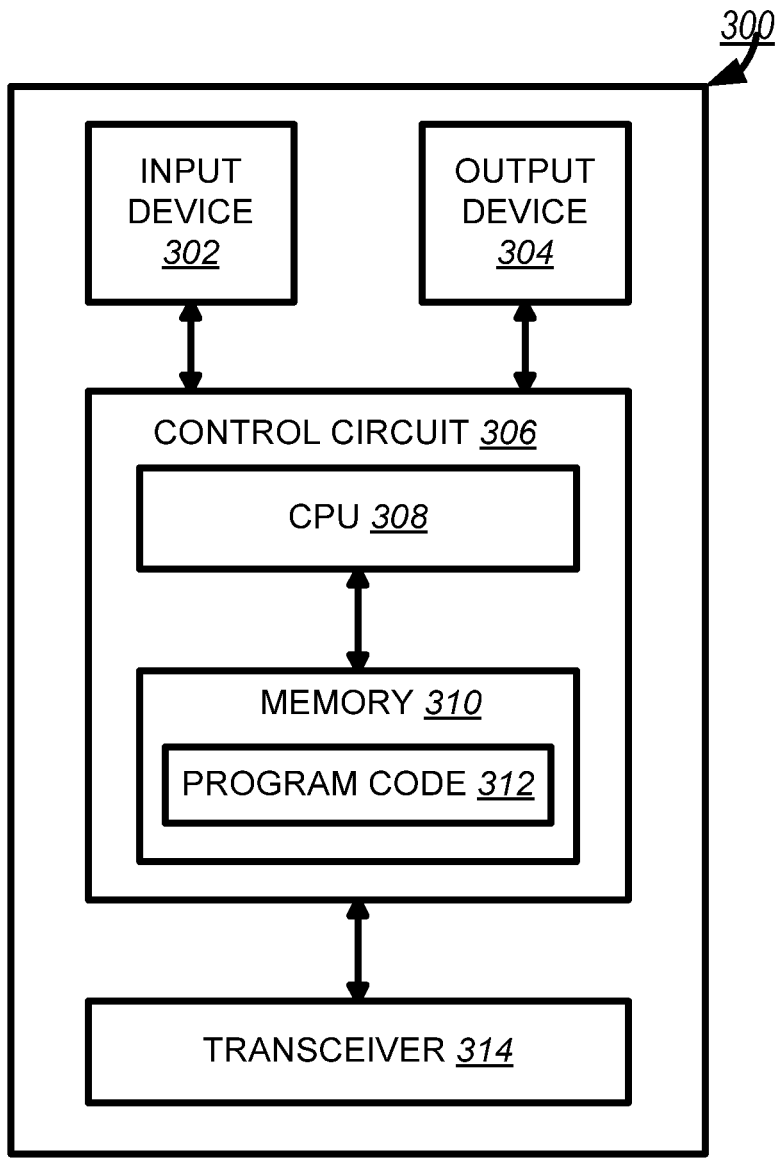
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
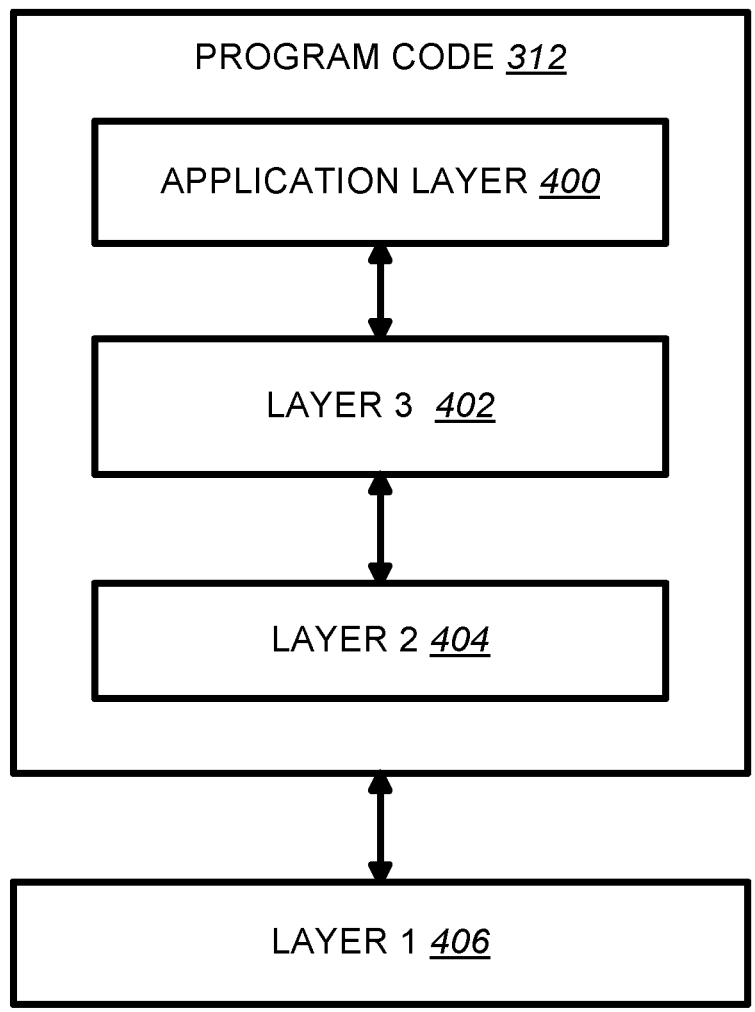
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.303 specifies two mechanisms of UE-to-Network Relay Discovery (i.e. Model A and Model B) for a UE to discover other UEs. 3GPP TR 23.752 further proposes to support UE-to-Network relay and Layer 2 (L2) and Layer 3 (L3) relay solutions are included for the following release (i.e. Release 17). The related issue and a L2 relay solution in 3GPP TR 23.752 are as follows:

5.3 Key Issue #3: Support of UE-to-Network Relay 5.3.1 General Description

According to TS 22.261 [3] and TS 22.278 [2], support for UE-to-Network Relay needs to be studied. In addition, the Rel-16 5G architectural design (e.g. flow-based QoS communication over PC5/Uu interface) shall be taken into consideration as well.

Figure 5:
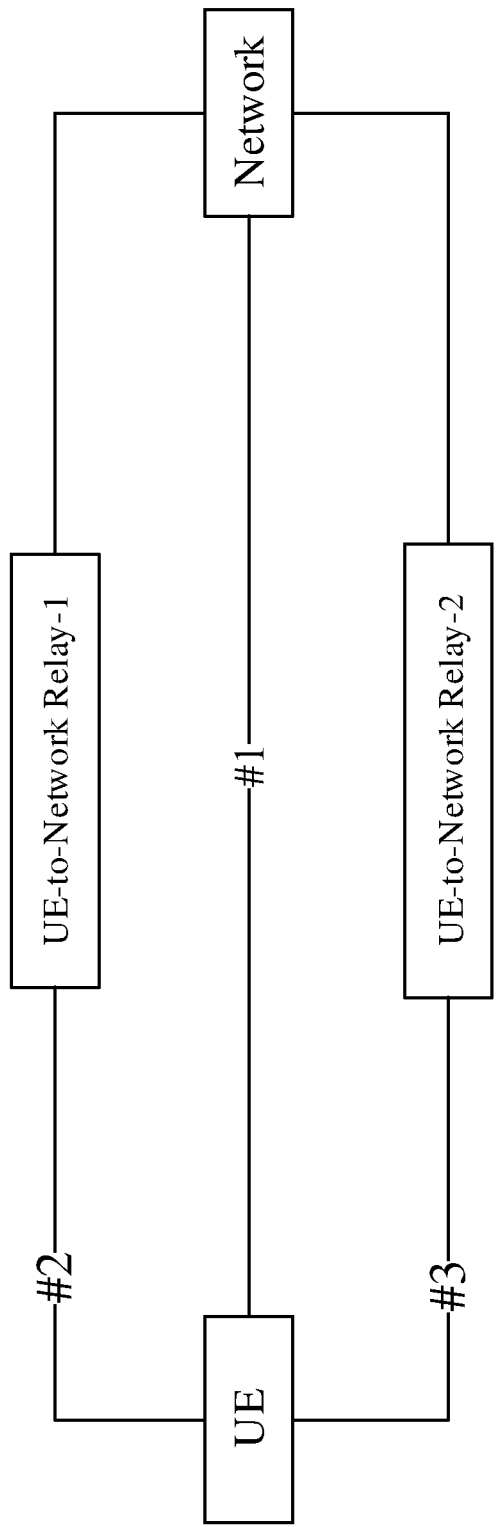
FIG. 5 is a reproduction of FIG. 5.3.1-1 of 3GPP TS 23.303 V16.0.0.

The case that UE may be able to access to network via the direct network communication or the indirect network communication illustrated in FIG. 5.3.1-1 needs to be considered, where path #1 is direct network communication path that may not exist, as well as path #2 and path #3 are indirect network communication paths via different UE-to-Network Relays.

[FIG. 5.3.1-1 of 3GPP TS 23.303 V16.0.0, Entitled "Example Scenario of Direct or Indirect Network Communication Path Between UE and Network", is Reproduced as FIG. 5]

Therefore, 5G ProSe needs to support UE-to-Network Relay. In particular, the following aspects need to be studied:

How to authorize a UE to be a 5G UE-to-Network Relay and how to authorize a UE to access 5GC via a 5G UE-to-Network Relay.

How to establish a connection between Remote UE and a UE-to-Network Relay to support connectivity to the network for the Remote UE.

How to support end-to-end requirements between Remote UE and the network via a UE-to-Network Relay, including QoS (such as data rate, reliability, latency) and the handling of PDU Session related attributes (e.g. S-NSSAI, DNN, PDU Session Type and SSC mode).

How the network allows and controls the QoS requirement for 5G ProSe UE-to-NW relay.

How to transfer data between the Remote UE and the network over the UE-to-Network Relay.

NOTE 1: Security and privacy aspects will be handled by SA WG3.

How to (re) select a UE-to-Network Relay for communication path selection between two indirect network communication paths (i.e. path #2 and path #3 in FIG. 5.3.1-1).

How to perform communication path selection between a direct network communication path (i.e. path #1 in FIG. 5.3.1-1) and an indirect network communication path (i.e. path #2 or path #3 in FIG. 5.3.1-1).

How to guarantee service continuity during these communication path switch procedures for switching between a direct network communication path and an indirect communication path, as well as for switching between two indirect network communication paths.

NOTE 2: Support of non-unicast mode communication (i.e. one-to-many communication/broadcast or multicast) between network and UE-to-Network Relay UE and between UE-to-Network Relay and Remote UE(s) depends on the result of FS_5MBS work.

Two cases can be considered regarding support of UE-to-Network Relay, i.e. UE-to-Network Relay served by gNB as shown in FIG. 5.3.1-2 and UE-to-Network Relay served by ng-eNB as shown in FIG. 5.3.1-3.

Figure 6:
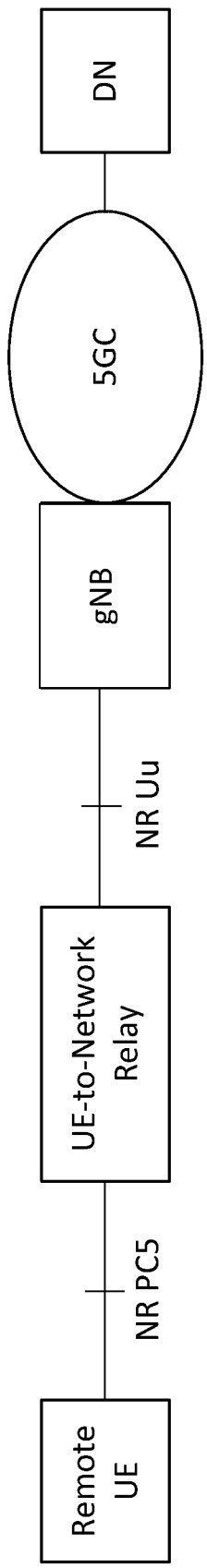
FIG. 6 is a reproduction of FIG. 5.3.1-2 of 3GPP TS 23.303 V16.0.0.

[FIG. 5.3.1-2 of 3GPP TS 23.303 V16.0.0, Entitled "UE-to-Network Relay Served by gNB", is Reproduced as FIG. 6]

Figure 7:
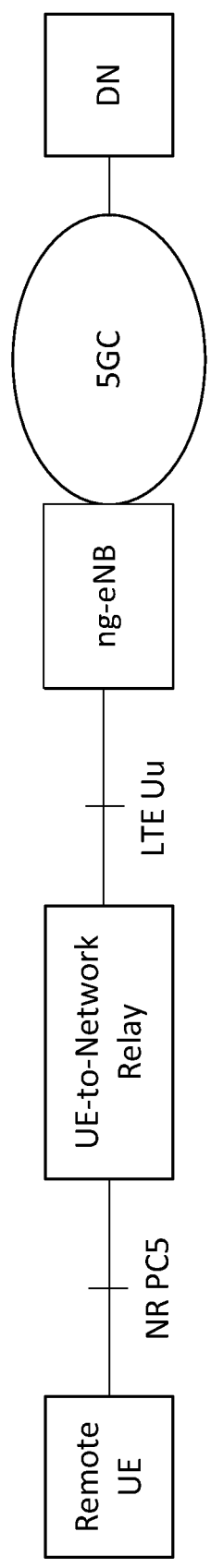
FIG. 7 is a reproduction of FIG. 5.3.1-3 of 3GPP TS 23.303 V16.0.0.

[FIG. 5.3.1-3 of 3GPP TS 23.303 V16.0.0, Entitled "UE-to-Network Relay Served by Ng-eNB", is Reproduced as FIG. 7]

NOTE 3: Whether to support the case that a UE-to-Network Relay is served by ng-eNB depends on solution to be identified in this study and RAN decision.

NOTE 4: When UE-to-Network Relay moves to E-UTRAN, LTE PC5 based ProSe UE-to-Network Relay can be supported as defined TS 23.303 [9] for Public Safety.

6.44 Solution #44: QoS Handling for Layer-2 Relay 6.44.1 Description

This is a solution for Key Issue #3 "Support of UE-to-Network Relay", which is applied to Layer-2 UE-to-Network Relay QoS handling.

In Layer 2 UE-to-NW relay solution (Solution #7), the Remote UE's data flow is served by its own PDU Session. RAN has the knowledge of that the PDU session is for Layer 2 UE-to-NW relay. In order to fulfil the QoS parameters, RAN needs to determine the suitable configurations over the PC5 leg and Uu leg. To reduce the RAN impacts, SMF can provide some guidance to RAN. SMF generates the Uu QoS profile and PC5 QoS profile and then provide them to RAN. RAN will take these QoS profiles as the principles to determine the configurations over PC5 leg and Uu leg. If the dynamic PCC control is supported, SMF can base on the PCF provided PCC rules over Uu leg and PC5 leg to generate the Uu QoS profile and PC5 QoS profile.

In this solution, it is assumed that the remote UE's core network has the knowledge of remote UE is accessing via a UE-to-Network Relay.

NOTE: The details of how to determine the configurations over Uu and PC5 legs are implemented by RAN.

6.44.2 Procedures

Figure 8:
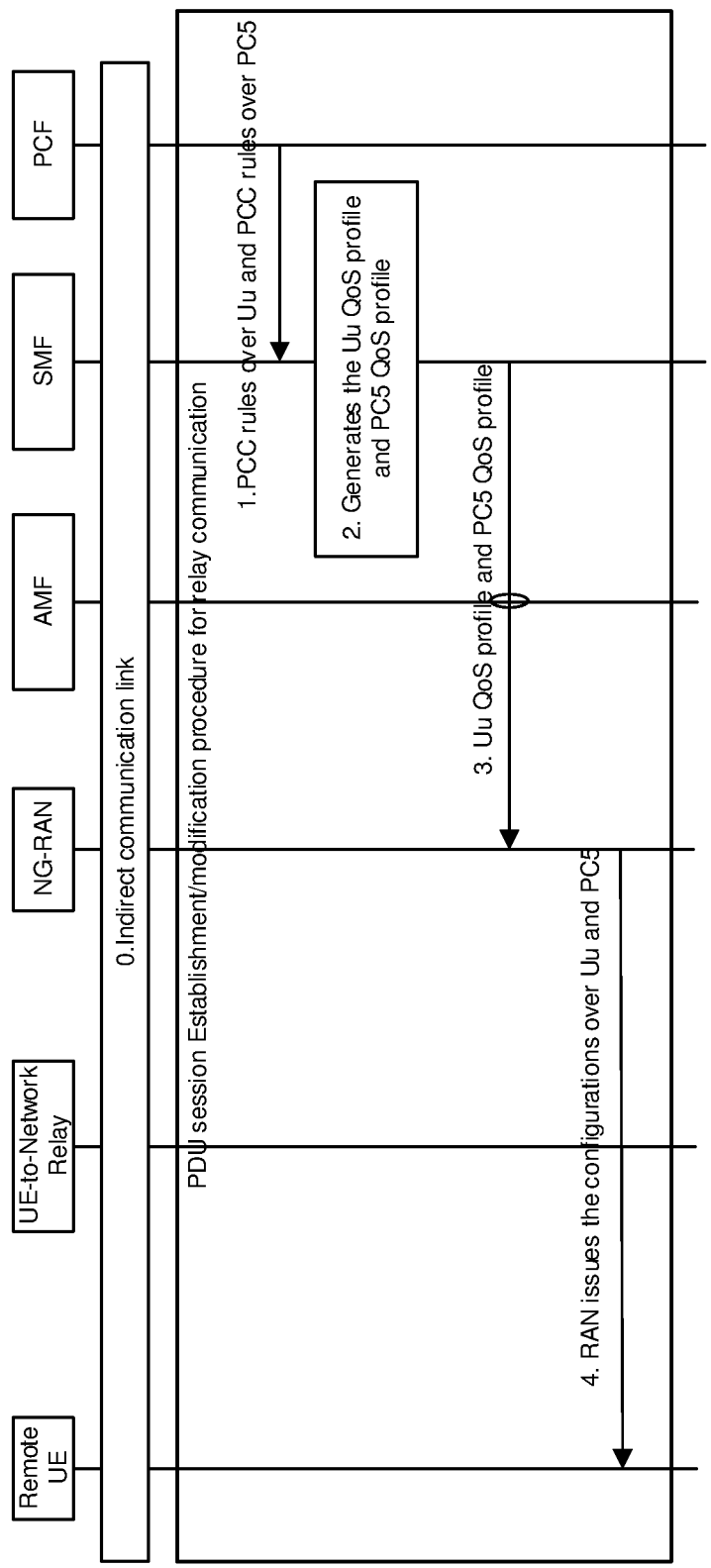
FIG. 8 is a reproduction of FIG. 6.44.2-1 of 3GPP TS 23.303 V16.0.0.

[FIG. 6.44.2-1 of 3GPP TS 23.303 V16.0.0, Entitled "QoS Handling for Layer-2 Relay", is Reproduced as FIG. 8]

0. It is assumed there is an indirect communication link for remote UE via a UE-to-Network relay based on the Layer-2 relay.

1. During the PDU session establishment or modification procedure, if the dynamic PCC control is supported, the PCF generates the PCC rules over Uu leg and PC5 leg based on the operator policies and the charging rate over Uu and PC5, and then send them to SMF in the SM Policy Association Establishment or SM Policy Association Modification procedure.

2. SMF based on the received PCC rules over Uu leg and PC5 leg generates the corresponding Uu QoS profile and PC5 QoS profile.

3. SMF sends the corresponding Uu QoS profile and PC5 QoS profile to RAN.

4. The RAN issues the configurations over Uu leg and PC5 leg based on the Uu QoS profile and PC5 QoS profile provided by SMF.

6.44.3 Impacts on Services, Entities and Interfaces

PCF:

Generates PCC rules over Uu and PC5 (for QoS control over Uu and PC5).

SMF:

Generates QoS profile over Uu and PC5 (for QoS control over Uu and PC5).

RAN:
  Performs the configurations over Uu and PC5 based on the SMF provided QoS profile.

3GPP TS 23.502 specifies the Protocol Data Unit (PDU) session establishment procedure for a UE to establish a new PDU session with the network as follows:

4.3.2 PDU Session Establishment
4.3.2.1 General
  A PDU Session establishment may correspond to:
    a UE initiated PDU Session Establishment procedure.
    a UE initiated PDU Session handover between 3GPP and non-3GPP.
    a UE initiated PDU Session handover from EPS to 5GS.
    a Network triggered PDU Session Establishment procedure. In this case the network sends the device trigger message to application(s) on the UE side. The payload included in Device Trigger Request message contains information on which application on the UE side is expected to trigger the PDU Session establishment request. Based on that information, the application(s) on the UE side trigger the PDU Session Establishment procedure. For more detail refer to clause 4.13.2.
  If the UE is simultaneously registered to a non-3GPP access via a N3IWF/TNGF/W-AGF located in a PLMN different from the PLMN of the 3GPP access, the functional entities in the following procedures are located in the PLMN of the access used to exchange NAS with the UE for the PDU Session.
  As specified in TS 23.501 [2], clause 5.6.1, a PDU Session may be associated either (a) with a single access type at a given time, i.e. either 3GPP access or non-3GPP access, or (b) simultaneously with multiple access types, i.e. one 3GPP access and one non-3GPP access. A PDU Session associated with multiple access types is referred to as Multi Access-PDU (MA PDU) Session and it may be requested by ATSSS-capable UEs.
  The following clause 4.3.2.2 specifies the procedures for establishing PDU Sessions associated with a single access type at a given time. The particular procedures associated with MA PDU
  Sessions are specified as part of the ATSSS procedures in clause 4.22.

4.3.2.2 UE Requested PDU Session Establishment
4.3.2.2.1 Non-Roaming and Roaming with Local Breakout
  Clause 4.3.2.2.1 specifies PDU Session establishment in the non-roaming and roaming with local breakout cases. The procedure is used to:
    Establish a new PDU Session;
    Handover a PDN Connection in EPS to PDU Session in 5GS without N26 interface;
    Switching an existing PDU Session between non-3GPP access and 3GPP access. The specific system behaviour in this case is further defined in clause 4.9.2; or
    Request a PDU Session for Emergency services.
    [ . . . ]

3GPP TS 38.331 specifies signalling radio bearers, RRC connection establishment, RRC reconfiguration, and Sidelink UE information procedure as follows:

4.2.2 Signalling Radio Bearers
  "Signalling Radio Bearers" (SRBs) are defined as Radio Bearers (RBs) that are used only for the transmission of RRC and NAS messages. More specifically, the following SRBs are defined:
    SRB0 is for RRC messages using the CCCH logical channel;
    SRB1 is for RRC messages (which may include a piggybacked NAS message) as well as for NAS messages prior to the establishment of SRB2, all using DCCH logical channel;
    SRB2 is for NAS messages and for RRC messages which include logged measurement information, all using DCCH logical channel. SRB2 has a lower priority than SRB1 and may be configured by the network after AS security activation;
    SRB3 is for specific RRC messages when UE is in (NG) EN-DC or NR-DC, all using DCCH logical channel.

In downlink, piggybacking of NAS messages is used only for one dependent (i.e. with joint success/failure) procedure: bearer establishment/modification/release. In uplink piggybacking of NAS message is used only for transferring the initial NAS message during connection setup and connection resume.

NOTE 1: The NAS messages transferred via SRB2 are also contained in RRC messages, which however do not include any RRC protocol control information.

Once AS security is activated, all RRC messages on SRB1, SRB2 and SRB3, including those containing NAS messages, are integrity protected and ciphered by PDCP. NAS independently applies integrity protection and ciphering to the NAS messages, see TS 24.501 [23]. Split SRB is supported for all the MR-DC options in both SRB1 and SRB2 (split SRB is not supported for SRB0 and SRB3).
  For operation with shared spectrum channel access, SRB0, SRB1 and SRB3 are assigned with the highest priority Channel Access Priority Class (CAPC), (i.e. CAPC=1) while CAPC for SRB2 is configurable.
    [ . . . ]

Figure 9:
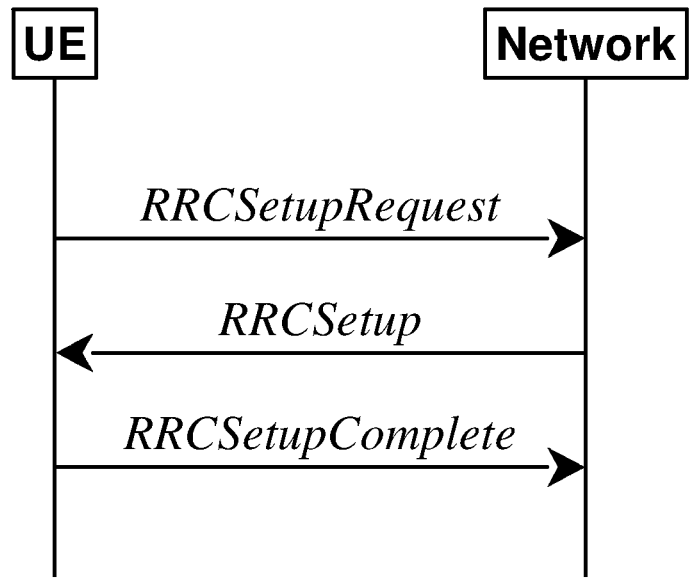
FIG. 9 is a reproduction of FIG. 5.3.3.1-1 of 3GPP 38,331 V16.1.0.

5.3.3 RRC Connection Establishment
5.3.3.1 General
[FIG. 5.3.3.1-1 of 3GPP 38,331 V16.1.0, Entitled "RRC Connection Establishment, successful", is reproduced as FIG. 9]
    [ . . . ]
  The purpose of this procedure is to establish an RRC connection. RRC connection establishment involves SRB1 establishment. The procedure is also used to transfer the initial NAS dedicated information/message from the UE to the network.
  The network applies the procedure e.g. as follows:
    When establishing an RRC connection;
    When UE is resuming or re-establishing an RRC connection, and the network is not able to retrieve or verify the UE context. In this case, UE receives RRCSetup and responds with RRCSetupComplete.
    [ . . . ]

Figure 10:
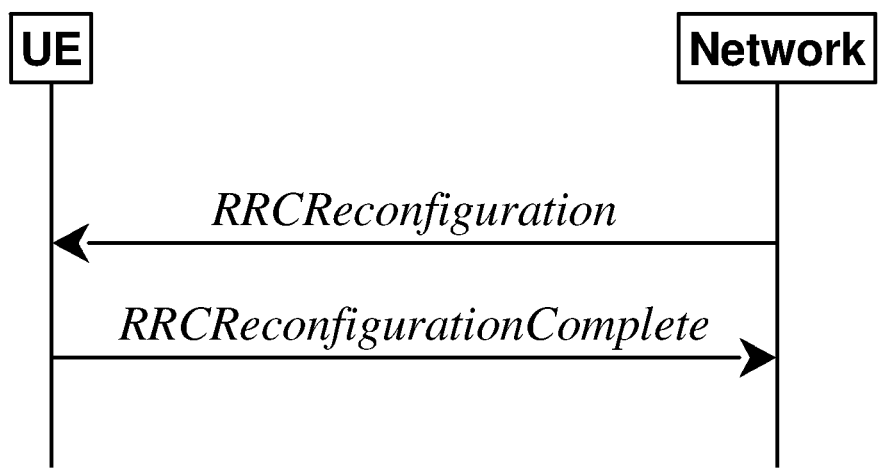
FIG. 10 is a reproduction of FIG. 5.3.5.1-1 of 3GPP 38,331 V16.1.0.

5.3.5 RRC Reconfiguration
5.3.5.1 General
[FIG. 5.3.5.1-1 of 3GPP 38,331 V16.1.0, Entitled "RRC Reconfiguration, Successful", is Reproduced as FIG. 10]
    [ . . . ]
  The purpose of this procedure is to modify an RRC connection, e.g. to establish/modify/release RBs, to perform reconfiguration with sync, to setup/modify/release measurements, to add/modify/release SCells and cell groups, to add/modify/release conditional handover configuration, to add/modify/release conditional PSCell change configuration. As part of the procedure, NAS dedicated information may be transferred from the Network to the UE.
    [ . . . ]

5.3.5.2 Initiation

The Network may initiate the RRC reconfiguration procedure to a UE in RRC_CONNECTED. The Network applies the procedure as follows:

the establishment of RBs (other than SRB1, that is established during RRC connection establishment) is performed only when AS security has been activated;

the addition of Secondary Cell Group and SCells is performed only when AS security has been activated;

the reconfigurationWithSync is included in secondaryCellGroup only when at least one RLC bearer is setup in SCG;

the reconfigurationWithSync is included in masterCellGroup only when AS security has been activated, and SRB2 with at least one DRB or, for IAB, SRB2, are setup and not suspended;

the conditionalReconfiguration for CPC is included only when at least one RLC bearer is setup in SCG;

the conditionalReconfiguration for CHO is included only when AS security has been activated, and SRB2 with at least one DRB or, for IAB, SRB2, are setup and not suspended.

[ . . . ]

5.8.3 Sidelink UE Information for NR Sidelink Communication 5.8.3.1 General

Figure 11:
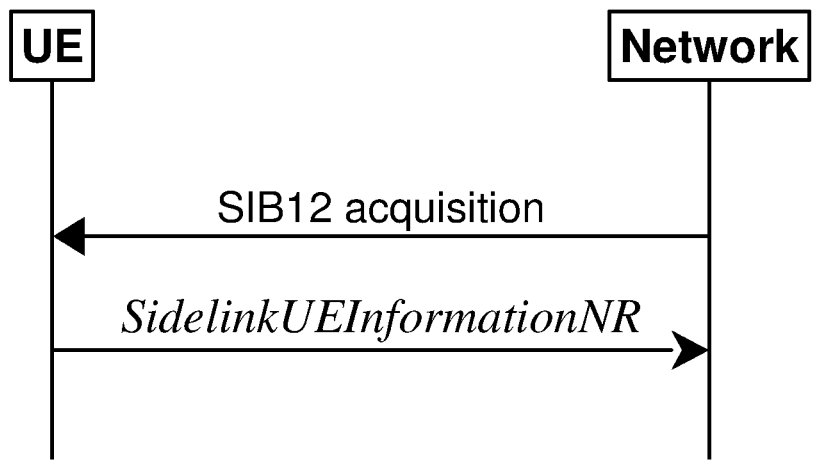
FIG. 11 is a reproduction of FIG. 5.8.3.1-1 of 3GPP 38,331 V16.1.0.

[FIG. 5.8.3.1-1 of 3GPP 38,331 V16.1.0, Entitled "Sidelink UE Information for NR Sidelink Communication", is Reproduced as FIG. 11]

The purpose of this procedure is to inform the network that the UE:

is interested or no longer interested to receive or transmit NR sidelink communication, is requesting assignment or release of transmission resource for NR sidelink communication, is reporting parameters and QoS profiles(s) related to NR sidelink communication, is reporting that a sidelink radio link failure or sidelink RRC reconfiguration failure has been detected.

5.8.3.2 Initiation

A UE capable of NR sidelink communication that is in RRC_CONNECTED may initiate the procedure to indicate it is (interested in) receiving or transmitting NR sidelink communication in several cases including upon successful connection establishment or resuming, upon change of interest, upon changing QoS profiles(s) or upon change to a PCell providing SIB12 including sl-ConfigCommonNR. A UE capable of NR sidelink communication may initiate the procedure to request assignment of dedicated sidelink DRB configuration and transmission resources for NR sidelink communication transmission. A UE capable of NR sidelink communication may initiate the procedure to report to the network that a sidelink radio link failure or sidelink RRC reconfiguration failure has been declared.

Upon initiating this procedure, the UE shall:
1> if SIB12 including sl-ConfigCommonNR is provided by the PCell:
  2> ensure having a valid version of SIB12 for the PCell;
  2> if configured by upper layers to receive NR sidelink communication on the frequency included in sl-FreqInfoList in SIB12 of the PCell:
    3> if the UE did not transmit a SidelinkUEInformationNR message since last entering RRC_CONNECTED state; or
    3> if since the last time the UE transmitted a SidelinkUEInformationNR message the UE connected to a PCell not providing SIB12 including sl-ConfigCommonNR; or
    3> if the last transmission of the SidelinkUEInformationNR message did not include sl-RxinterestedFreqList; or if the frequency configured by upper layers to receive NR sidelink communication on has changed since the last transmission of the SidelinkUEInformationNR message:
      4> initiate transmission of the SidelinkUEInformationNR message to indicate the NR sidelink communication reception frequency of interest in accordance with 5.8.3.3;
  2> else:
    3> if the last transmission of the SidelinkUEInformationNR message included sl-RxInterestedFreqList:
      4> initiate transmission of the SidelinkUEInformationNR message to indicate it is no longer interested in NR sidelink communication reception in accordance with 5.8.3.3;
  2> if configured by upper layers to transmit NR sidelink communication on the frequency included in sl-FreqInfoList in SIB12 of the PCell:
    3> if the UE did not transmit a SidelinkUEInformationNR message since last entering RRC_CONNECTED state; or
    3> if since the last time the UE transmitted a SidelinkUEInformationNR message the UE connected to a PCell not providing SIB12 including sl-ConfigCommonNR; or
    3> if the last transmission of the SidelinkUEInformationNR message did not include sl-TxResourceReqList; or if the information carried by the sl-TxResourceReqList has changed since the last transmission of the SidelinkUEInformationNR message:
      4> initiate transmission of the SidelinkUEInformationNR message to indicate the NR sidelink communication transmission resources required by the UE in accordance with 5.8.3.3;
  2> else:
    3> if the last transmission of the SidelinkUEInformationNR message included si-TxResourceReqList:
      4> initiate transmission of the SidelinkUEInformationNR message to indicate it no longer requires NR sidelink communication transmission resources in accordance with 5.8.3.3.

5.8.3.3 Actions Related to Transmission of SidelinkUEInformationNR Message

The UE shall set the contents of the SidelinkUEInformationNR message as follows:
1> if the UE initiates the procedure to indicate it is (no more) interested to receive NR sidelink communication or to request (configuration/release) of NR sidelink communication transmission resources or to report to the network that a sidelink radio link failure or sidelink RRC reconfiguration failure has been declared (i.e. UE includes all concerned information, irrespective of what triggered the procedure):
  2> if SIB12 including sl-ConfigCommonNR is provided by the PCell:
    3> if configured by upper layers to receive NR sidelink communication:
      4> include sl-RxInterestedFreqList and set it to the frequency for NR sidelink communication reception;

3> if configured by upper layers to transmit NR sidelink communication:
  4> include sl-TxResourceReqList and set its fields (if needed) as follows for each destination for which it requests network to assign NR sidelink communication resource:
    5> set sl-DestinationIdentity to the destination identity configured by upper layer for NR sidelink communication transmission;
    5> set sl-CastType to the cast type of the associated destination identity configured by the upper layer for the NR sidelink communication transmission;
    5> set sl-RLC-ModeIndication to include the RLC mode(s) and optionally Qos profile(s) of the sidelink QoS flow(s) of the associated RLC mode(s), if the associated bi-directional sidelink DRB has been established due to the configuration by RRCReconfigurationSidelink;
    5> set sl-QoS-InfoList to include QoS profile(s) of the sidelink QoS flow(s) of the associated destination configured by the upper layer for the NR sidelink communication transmission;
    5> set sl-InterestedFreqList to indicate the frequency for NR sidelink communication transmission;
    5> set sl-TypeTxSyncList to the current synchronization reference type used on the associated sl-InterestedFreqList for NR sidelink communication transmission.
    5> set sl-CapabilityInformationSidelink to include UECapabilityInformationSidelink message, if any, received from peer UE.
  4> include sl-FailureList and set its fields as follows for each destination for which it reports the NR sidelink communication failure:
    5> set sl-DestinationIdentity to the destination identity configured by upper layer for NR sidelink communication transmission;
    5> set sl-Failure as rlf for the associated destination for the NR sidelink communication transmission, if the sidelink RLF is detected as specified in sub-clause 5.8.9.3;
    5> set sl-Failure as configFailure for the associated destination for the NR sidelink communication transmission, if RRCReconfigurationFailureSidelink is received;
1> if the UE initiates the procedure while connected to an E-UTRA PCell:
  2> submit the SidelinkUEInformationNR to lower layers via SRB1, embedded in LTE RRC message ULInformationTransferIRAT as specified in TS 36.331 [10], clause 5.6.x;
1> else:
  2> submit the SidelinkUEInformationNR message to lower layers for transmission.

. . .

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

RRCReconfiguration Message

```
-- ASN1START
-- TAG-RRCRECONFIGURATION-START
...
RRCReconfiguration-v1610-IEs ::=        SEQUENCE {
    otherConfig-v1610           OtherConfig-v1610                       OPTIONAL, -- Need M
    bap-Config-r16              SetupRelease { BAP-Config-r16 }         OPTIONAL, -- Need M
    iab-IP-AddressConfigurationList-r16     IAB-IP-AddressConfigurationList-r16     OPTIONAL, -- Need M
    conditionalReconfiguration-r16          ConditionalReconfiguration-r16          OPTIONAL, -- Need M
    daps-SourceRelease-r16          ENUMERATED{true}                    OPTIONAL, -- Need N
    t316-r16                    SetupRelease {T316-r16}                 OPTIONAL, -- Need M
    needForGapsConfigNR-r16         SetupRelease {NeedForGapsConfigNR-r16}  OPTIONAL, -- Need M
    onDemandSIB-Request-r16         SetupRelease { OnDemandSIB-Request-r16 }    OPTIONAL, -- Need M
    dedicatedPosSysInfoDelivery-r16     OCTET STRING (CONTAINING PosSystemInformation-r16-IEs)      OPTIONAL, -- Need N
    sl-ConfigDedicatedNR-r16        SetupRelease {SL-ConfigDedicatedNR-r16}     OPTIONAL, -- Need M
    sl-ConfigDedicatedEUTRA-Info-r16    SetupRelease {SL-ConfigDedicatedEUTRA-Info-r16}     OPTIONAL, -- Need M
    nonCriticalExtension            SEQUENCE { }                        OPTIONAL
}
...
```

SL-ConfigDedicatedNR

The IE SL-ConfigDedicatedNR specifies the dedicated configuration information for NR sidelink communication.

SL-ConfigDedicatedNR Information Element

```
-- ASN1START
-- TAG-SL-CONFIGDEDICATEDNR-START
SL-ConfigDedicatedNR-r16 ::=                    SEQUENCE {
    sl-PHY-MAC-RLC-Config-r16                       SL-PHY-MAC-RLC-Config-r16           OPTIONAL,    -- Need M
    sl-RadioBearerToReleaseList-r16                 SEQUENCE (SIZE (1..maxNrofSLRB-r16)) OF SLRB-Uu-ConfigIndex-r16    OPTIONAL, -- Need N
    sl-RadioBearerToAddModList-r16                  SEQUENCE (SIZE (1..maxNrofSLRB-r16)) OF SL-RadioBearerConfig-r16    OPTIONAL, -- Need N
    sl-MeasConfigInfoToReleaseList-r16              SEQUENCE (SIZE (1..maxNrofSL-Dest-r16)) OF SL-DestinationIndex-r16    OPTIONAL, -- Need N
    sl-MeasConfigInfoToAddModList-r16               SEQUENCE (SIZE (1..maxNrofSL-Dest-r16)) OF SL-MeasConfigInfo-r16    OPTIONAL, -- Need M
    t400-r16                    ENUMERATED {ms100, ms200, ms300, ms400, ms600, ms1000, ms1500, ms2000} OPTIONAL, -- Need M
    ...
}
SL-DestinationIndex-r16 ::=         INTEGER (0..maxNrofSL-Dest-1-r16)
SL-PHY-MAC-RLC-Config-r16 ::=       SEQUENCE {
    sl-ScheduledConfig-r16                      SetupRelease { SL-ScheduledConfig-r16 }    OPTIONAL, -- Need M
    sl-UE-SelectedConfig-r16                    SetupRelease { SL-UE-SelectedConfig-r16 }    OPTIONAL, -- Need M
    sl-FreqInfoToReleaseList-r16                SEQUENCE (SIZE (1..maxNrofFreqSL-r16)) OF SL-Freq-Id-r16    OPTIONAL, -- Need N
    sl-FreqInfoToAddModList-r16                 SEQUENCE (SIZE (1..maxNrofFreqSL-r16)) OF SL-FreqConfig-r16    OPTIONAL, -- Need N
    sl-RLC-BearerToReleaseList-r16              SEQUENCE (SIZE (1..maxSL-LCID-r16)) OF SL-RLC-BearerConfigIndex-r16    OPTIONAL,- - Need N
    sl-RLC-BearerToAddModList-r16               SEQUENCE (SIZE (1..maxSL-LCID-r16)) OF SL-RLC-BearerConfig-r16    OPTIONAL, -- Need N
    sl-MaxNumConsecutiveDTX-r16                 ENUMERATED {n1, n2, n3, n4, n6, n8, n16, n32}    OPTIONAL, -- Need M
    sl-CSI-Acquisition-r16                      ENUMERATED {enabled}                 OPTIONAL, -- Need R
    sl-CSI-SchedulingRequestId-r16              SetupRelease {SchedulingRequestid}    OPTIONAL, -- Need M
    sl-SSB-PriorityNR-r16                       INTEGER (1..8)                       OPTIONAL, -- Need R
    networkControlledSyncTx-r16                 ENUMERATED {on, off}                 OPTIONAL -- Need M
}
-- TAG-SL-CONFIGDEDICATEDNR-STOP
-- ASN1STOP
```

SidelinkUEInformationNR

The SidelinkUEinformationNR message is used for the indication of NR sidelink UE information to the network.

SidelinkUEInformationNR Message

```
-- ASN1START
-- TAG-SIDELINKUEINFORMATIONNR-START
SidelinkUEInformationNR-r16::=          SEQUENCE {
    criticalExtensions          CHOICE {
        sidelinkUEInformationNR-r16             SidelinkUEInformationNR-r16-IEs,
        criticalExtensionsFuture        SEQUENCE { }
    }
}
SidelinkUEInformationNR-r16-IEs ::=     SEQUENCE {
    sl-RxInterestedFreqList-r16         SL-InterestedFreqList-r16           OPTIONAL,
    sl-TxResourceReqList-r16            SL-TxResourceReqList-r16            OPTIONAL,
    sl-FailureList-r16                  SL-FailureList-r16                  OPTIONAL,
    lateNonCriticalExtension            OCTET STRING                        OPTIONAL,
    nonCriticalExtension                SEQUENCE { }                        OPTIONAL
}
```

```
SL-InterestedFreqList-r16 ::=       SEQUENCE (SIZE (1..maxNrofFreqSL-r16)) OF INTEGER (1..maxNrofFreqSL-r16)
```

```
SL-TxResourceReqList-r16 ::=           SEQUENCE (SIZE (1..maxNrofSL-Dest-r16)) OF SL-
TxResourceReq-r16
SL-TxResourceReq-r16 ::=               SEQUENCE {
    sl-DestinationIdentity-r16             SL-DestinationIdentity-r16,
    sl-CastType-r16                    ENUMERATED {broadcast, groupcast, unicast, spare1},
    sl-RLC-ModeIndicationList-r16          SEQUENCE (SIZE (1..maxNrofSLRB-r16)) OF SL-RLC-
ModeIndication-r16         OPTIONAL,
    sl-QoS-InfoList-r16                SEQUENCE (SIZE (1..maxNrofSL-QFIsPerDest-r16)) OF SL-QoS-
Info-r16       OPTIONAL,
    sl-TypeTxSyncList-r16              SEQUENCE (SIZE (1..maxNrofFreqSL-r16)) OF SL-TypeTxSync-
r16            OPTIONAL,
    sl-TxInterestedFreqList-r16            SL-TxInterestedFreqList-r16
OPTIONAL,
    sl-CapabilityInformationSidelink-r16       OCTET STRING
OPTIONAL
}
SL-TxInterestedFreqList-r16 ::=        SEQUENCE (SIZE (1..maxNrofFreqSL-r16)) OF INTEGER
(1..maxNrofFreqSL-r16)
SL-QoS-Info-r16 ::=            SEQUENCE {
    sl-QoS-FlowIdentity-r16            SL-QoS-FlowIdentity-r16,
    sl-QoS-Profile-r16             SL-QoS-Profile-r16                      OPTIONAL
}
SL-RLC-ModeIndication-r16 ::=              SEQUENCE {
    sl-Mode-r16                    CHOICE {
        sl-AM-Mode-r16                     NULL,
        sl-UM-Mode-r16                     NULL
    },
    sl-QoS-InfoList-r16                SEQUENCE (SIZE (1..maxNrofSL-QFIsPerDest-r16)) OF SL-QoS-Info-
r16
}
SL-FailureList-r16 ::=             SEQUENCE (SIZE (1..maxNrofSL-Dest-r16)) OF SL-Failure-r16
SL-Failure-r16 ::=                 SEQUENCE {
    sl-DestinationIdentity-r16             SL-DestinationIdentity-r16,
    sl-Failure-r16                 ENUMERATED { rlf,configFailure, spare6, spare5, spare4, spare3,
spare2, spare1}
}
-- TAG-SIDELINKUEINFORMATIONNR-STOP
-- ASN1STOP
```

According to the normal RRC connection establishment procedure specified in 3GPP TS 38.331, a RRCSetupRequest message is transmitted on SRB0 to a gNB by a UE. In response to reception of the RRCSetupRequest message, gNB will transmit a RRCSetup message on SRB0 to the UE to establish SRB1. The UE then replies with a RRCSetupComplete message on SRB1. The RRCSetup message includes IE RadioBearerConfig associated with SRB1, while IE RLC-BearerConfig associated with SRB1 is included in the default SRB configurations pre-defined in 3GPP TS 38.331. SRB2 and SRB3 may be established via a RRC reconfiguration procedure after AS security has been activated.

3GPP R2-200847 gives an overview on study aspects of UE-to-Network relay, focusing on the solutions for L2 UE-to-Network relay. FIG. 2 (not shown in the present application) of 3GPP R2-2008047 describes a protocol stack for L2 UE-to-Network relay. Basically, there are two legs in the protocol stack i.e. a PC5 (or SL) leg between a Remote UE and a Relay UE as well as a Uu leg between the Relay UE and the gNB. Regarding Signalling Radio Bearer (SRB) and Data Radio Bearer (DRB) configurations, 3GPP R2-2008047 raises the following proposals:
  Proposal 3: For Uu SRB0 of the Remote UE, related RLC bearer parameters on PC5 and Uu link are predefined by specification.
  Proposal 4: For Uu SRB1 and Uu SRB2 of the Remote UE, related PDCP and RLC bearer parameters on PC5 and Uu link can be configured by gNB.
  Proposal 5: For Uu DRB of the Remote UE, related Uu SDAP, Uu PDCP and RLC bearer parameters on PC5 and Uu link can be configured by gNB.

Regarding bearer mappings at remote UE and relay UE (illustrated in FIG. 3 (not shown in the present application) of 3GPP R2-2008047), 3GPP R2-2008047 raises the following proposals:
  Proposal 6: For remote UE, only 1 to 1 mapping between Uu PDCP entity and SL RLC bearer is supported.
  Proposal 7: For relay UE, both 1 to 1 mapping and N to 1 mapping between SL RLC bearer and Uu RLC bearer are supported.
  Proposal 8: In L2 UE-to-Network relay, all bearer/LCH mappings at remote UE and relay UE are configured by the gNB.

Following is an example how gNB can configure the bearer mapping:
  The Bearer ID, which identifies the Remote UE's Uu DRB, can be added in the adaptation layer header for the bearer mapping at relay UE and gNB, in case of N:1 mapping.
  At remote UE, the mapping table between Uu DRB ID to SL RLC ID is configured by gNB.
  At relay UE, the following mapping tables can be configured by gNB: 1) SL RLC ID to Uu RLC ID, for UL; 2) Bearer ID in adaptation header to SL RLC ID, for DL.

However, it is also possible to support N to 1 mapping between Uu Packet Data Convergence Protocol (PDCP) entity and SL RLC bearer for remote UE. In this situation, an adaptation layer between Uu PDCP and PC5 RLC in the remote UE may also need to be introduced to add and remove the bearer ID in the adaptation layer header.

Regarding the adaptation layers (referring to FIG. 3 (not shown in the present application) of 3GPP R2-2008047), 3GPP R2-2008047 raises the following proposals:

Proposal 9: No adaptation layer is needed in the SL hop for UE-to-Network relay.

Proposal 10: Adaptation layer above Uu RLC is needed in Uu hop for UE-to-Network relay.

Proposal 11: Bearer ID of the remote UE's DRB should be added in adaptation layer, to support N:1 mapping between SL RLC bearer to Uu RLC bearer at relay UE.

If multiple remote UEs can access the gNB via the same relay UE, a local UE identifier is needed between relay UE and gNB for distinguishing remote UEs and the relay UE. FIG. 6 (not shown in the present application) of 3GPP R2-2008047 illustrates data routing between the Remote UE and the gNB via the Relay UE as follows:

Step1: The gNB Knows which UE (i.e., Relay UE, Remote UE1 or Remote UE2) the DL Data Belongs to The gNB establishes higher L2 entities (i.e., Uu (Service Data Adaption Protocol) SDAP and Uu PDCP) for the DRBs of each UE sharing the same lower L2 entities (i.e., RLC and Medium Access Control (MAC)), and the gNB maintains the UE context including the local UE identifier of each UE.

When DL data arrives from one PDCP entity, the gNB knows which UE the PDCP entity belongs to. Correspondingly, the gNB is able to determine the local UE identifier to be included in the adaptation layer header. Then gNB sends the PDCP PDU together with the Adaptation layer header to relay UE.

Step2: Relay UE Receives the Data and Determines which Remote UE the Data Belongs to Previously, the relay UE and gNB have exchanged the local UE identifier, which means relay UE and gNB can use it as a reference to the dedicated remote UE or the relay UE. Upon receiving the data from gNB, the relay UE is able to interpret the adaptation layer header and get the included information, i.e., local UE identifier. Based on the local UE identifier, the relay UE is able to know the associated remote UE or the relay UE itself.

For uplink data transmission, the whole procedure is similar, i.e., the relay UE receives uplink PDCP PDU via the SL unicast from the remote UE or the relay UE itself. Relay UE is able to determine the local UE identifier based on the configuration previously provided by the gNB. Then relay UE adds adaptation layer header including the local UE identifier to the received PDCP PDU. Lastly, relay UE transmits the PDCP PDU together with adaptation layer header to gNB.

Accordingly, the following are proposed:

Proposal 12: For UE-to-Network L2 relay, a local identifier, included in adaptation layer header, is used for routing.

Proposal 13: The local identifier is allocated by a relay UE and uniquely identify one remote UE in the scope of the relay UE.

Furthermore, FIG. 7 (not shown in the present application) of 3GPP R2-2008047 describes how a Remote UE establishes a RRC connection with gNB via a Relay UE as follows:

Step1: Relay UE Discovery

In general, we think the basic discovery procedure defined in LTE can be reused as well as the Relay UE (re) selection criteria.

Step2: Unicast Connection Establishment

The unicast connection between Remote UE and Relay UE should be established. The details are pending on SA2.

Step2a/2b: Unified Access Control

As discussed in the following, the access control on remote UE is supported in this procedure. The relay UE may provide UAC parameters to remote UE when SL unicast connection is established. For example, it can be transmitted via the SL RRC message as dedicated parameters or included in SIB1 as a RRC container. Upon reception of the UAC parameters, the remote UE performs the Access Control by itself. If the access is allowed, the remote UE triggers RRC Setup procedure with gNB via relay UE.

Step3: Remote UE Sends Uu RRCSetupRequest to gNB Via Relay UE

Remote UE transmits RRCSetupRequest message to relay UE so that relay UE could relay this message to gNB. In details the remote UE could transmit RRCSetupRequest message to relay UE via a default SL RLC bearer, i.e., a default SL RLC bearer should be introduced to support the transmission of SRB0 related messages, e.g., RRCSetupRequest, RRCSetup.

Upon reception of the RLC SDU encapsulating RRCSetupRequest via the default SL RLC bearer between the remote UE, the relay UE is able to know it is a new remote UE. Then the relay UE allocates a local UE identifier for the remote UE and store it as the context of the remote UE together with the unicast connection ID, i.e., SRC L2 ID, DST L2 ID.

Further, the relay UE forwards the received RRCSetupRequest message to gNB, e.g. via a default Uu RLC bearer. In details, the relay UE adds the adaptation layer header including local UE identifier to the received RRCSetupRequest message and then transmits the adaptation layer PDU to gNB. The default Uu RLC bearer is introduced to carry SRB0 related messages in Uu.

Step4: gNB Transmits RRCSetup Message to Remote UE Via Relay UE

If the gNB accepts the request from remote UE, it responses the RRCSetup message to remote UE via relay UE. In details, the gNB adds adaptation layer header including the local UE identifier to the RRC PDU and transmits this adaptation layer PDU to relay UE.

Upon reception of the adaptation layer PDU encapsulating RRCSetup message, the relay UE acquires the local UE identifier from the adaptation layer header and determines the linked remote UE based on this local UE identifier. Then the relay UE is able to relay the received RRC PDU to remote UE.

Step5: Remote UE Transmits RRCSetupComplete Message to gNB Via Relay UE

Remote UE generates PDCP PDU encapsulating the RRCSetupComplete message and transmits this PDCP PDU to relay UE via sidelink unicast connection. Upon reception of the PDCP PDU encapsulating the RRCSetupComplete message, the relay UE is able to determine the associated local UE id. Then relay UE adds adaptation layer header including the local UE identifier to the PDCP PDU and sends it to gNB.

The protocol stack applied in the RRCSetupComplete message transmission procedure is illustrated in FIG. 5 (not shown in the present application) of 3GPP R2-2008047.

Step6: Initial AS Security Activation Procedure Between Remote UE and gNB

Initial AS Security Activation is performed between remote UE and gNB via Relay UE.

Step7: RRC Reconfiguration Procedure Between Remote UE and gNB

Similarly, the RRC Reconfiguration is performed between remote UE and gNB via relay UE.

As mentioned in 3GPP R2-2008047, upon reception of the RLC SDU encapsulating RRCSetupRequest sent from the remote UE via the default SL RLC bearer, the relay UE can know it is a new remote UE. And, the relay UE assigns or allocates a local UE identifier for the remote UE and stores it in the context of the remote UE together with the unicast connection IDs, i.e., Source L2 ID and Destination L2 ID. Alternatively, the local UE identifier for the remote UE may be assigned or allocated by gNB and provided to the relay UE.

Then, the relay UE forwards the received RRCSetupRequest message to gNB via a default Uu RLC bearer. In details, the relay UE includes the local UE identifier (ID) in the adaptation layer header and then transmits the adaptation layer PDU encapsulating the received RRCSetupRequest message to gNB. Upon reception of the RLC SDU encapsulating RRCSetupRequest forwarded by the relay UE, the gNB may maintain the UE context including the local UE ID of the remote UE and the Initial UE identity of the remote UE included in the RRCSetupRequest message.

After the RRC connection between the remote UE and the gNB is established, the remote UE may initiate a PDU session establishment procedure with the network to establish a PDU session. In response, the gNB may transmit a first RRCReconfiguration message to allocate a Uu radio bearer configuration, a SL RLC bearer configuration, and/or a Uu radio bearer to SL RLC bearer mapping (or association) to the remote UE. The relay UE may then forward the first RRCReconfiguration message to the remote UE according to the local UE ID included in the adaptation layer header.

In the meantime, gNB may transmit a second RRCReconfiguration message to allocate at least one of the following items to the relay UE to support UE-to-Network relaying: a SL RLC bearer configuration, a Uu radio bearer mapped to (or associated with) a SL RLC bearer (for UL), a SL RLC bearer to Uu RLC bearer mapping (for UL), a Uu radio bearer to SL RLC bearer mapping (for DL), and a Uu RLC bearer configuration. The Uu RLC bearer configuration, for example, may be optional because the related Uu RLC bearer may have been established for other Uu radio bearer of the same remote UE or other remote UE. Also, part of the items may be absent if the Uu radio bearer is uni-directional (i.e. UL only or DL only). Besides, if the same Uu radio bearer identity or Uu radio bearer configuration index is shared by both UL and DL, one of a Uu radio bearer mapped to (or associated with) a SL RLC bearer and a Uu radio bearer to SL RLC bearer mapping could be omitted. On the other hand, since the second RRCReconfiguration message aims at the relay UE, there may be no need for gNB to include the adaptation header for this message when transmitting this message.

Since the adaptation layer header in DL includes a local UE ID of a remote UE and a bearer ID of a Uu radio bearer used to transmit the adaptation layer PDU, it is supposed the value of a bearer ID is valid within the scope of a remote UE, which implies the same bearer ID value may be shared by multiple remote UEs connected with the relay UE. When receiving the adaptation layer PDU from gNB, the relay UE would first determine the remote UE according to the local UE ID and then select a SL RLC bearer to forward the corresponding adaptation layer SDU to the remote UE based on the bearer ID included in the adaptation layer header and the Uu radio bearer to SL RLC bearer mapping configured by gNB.

In this situation, the relay UE needs to know which remote UE a Uu radio bearer to SL RLC bearer mapping is allocated to. So, the second RRCReconfiguration message used to allocate the Uu radio bearer to SL RLC bearer mapping to the relay UE also needs to include information indicating the remote UE associated with the Uu radio bearer to SL RLC bearer mapping. The information, for example, may be the local UE ID of the remote UE. Table 1 below illustrates an exemplary Uu radio bearer to SL RLC bearer mapping table maintained in the relay UE for 3 remote UEs connected with the relay UE.

TABLE 1

Uu radio bearer to SL RLC bearer mapping table in a relay UE

| | Remote UE-1 | |
|---|---|---|
| 1 | Uu RB1 | SL RLC bearer1 |
| 2 | Uu RB2 | SL RLC bearer2 |
| 3 | Uu RB3 | SL RLC bearer3 |
| | Remote UE-2 | |
| 1 | Uu RB1 | SL RLC bearer4 |
| 2 | Uu RB2 | SL RLC bearer5 |
| 3 | Uu RB3 | SL RLC bearer6 |
| 4 | Uu RB4 | SL RLC bearer7 |
| | Remote UE-3 | |
| 1 | Uu RB1 | SL RLC bearer8 |
| 2 | Uu RB2 | SL RLC bearer9 |

In Table 1 above, an identity is used to identify a Uu radio bearer or a SL RLC bearer. It is also feasible to use an index associated with a Uu radio bearer configuration of the Uu radio bearer or a SL RLC bearer configuration of the SL RLC bearer. One potential way to indicate a Uu radio bearer to SL RLC bearer mapping is to include an identity of the Uu radio bearer or an index of a Uu radio bearer configuration of the Uu radio bearer in a SL RLC bearer configuration of the SL RLC bearer. The SL RLC bearer configuration may include an identity of the SL RLC bearer and/or an index of the SL RLC bearer configuration.

A similar issue may also exist for UL direction, where the relay UE needs to know which remote UE a Uu radio bearer to SL RLC bearer mapping is allocated to so that it can determine the bearer ID to be included in the adaptation layer header when receiving a SDU from the remote UE on the SL RLC bearer. Therefore, the second RRCReconfiguration message could be used to provide a first information indicating a Uu radio bearer to SL RLC bearer mapping also needs to include a second information indicating the remote UE associated with the first information. An identity of the Uu radio bearer or an index of a Uu radio bearer configuration of the Uu radio bearer may be included in a SL RLC bearer configuration of the SL RLC bearer to indicate the Uu radio bearer is mapped to (or associated with) the SL RLC bearer.

Similarly, an identity of a Uu RLC bearer or an index of a Uu RLC bearer configuration of the Uu RLC bearer may be included in a SL RLC bearer configuration of a SL RLC bearer to indicate the SL RLC radio bearer is mapped to (or associated with) the Uu RLC bearer.

In one embodiment, the key concept of the above solution may be described as follows:

gNB may transmit a RRCReconfiguration message to a relay UE, wherein the RRCReconfiguration message includes a first information indicating a mapping which represents an association between a Uu radio bearer and a SL RLC bearer and wherein the RRCReconfiguration message also includes a second information identifying a remote UE associated with the mapping. The mapping between the Uu radio bearer and the SL RLC bearer may be used for UL transmission, DL transmission, or both. It is also possible to use other RRC message to transmit the above information.

Basically, the Uu radio bearer may be identified by a Uu radio bearer identity and/or the SL RLC bearer may be identified by a SL RLC bearer identity or a logical channel identity (LCID). The RRCReconfiguration message may also include information indicating a SL RLC bearer configuration for the SL RLC bearer, a SL RLC bearer to Uu RLC bearer mapping, and/or a Uu RLC bearer configuration for the Uu RLC bearer. The identity of the Uu radio bearer may be included in a SL RLC bearer configuration for the SL RLC bearer to indicate the Uu radio bearer to SL RLC bearer mapping.

Given all the mappings between Uu radio bearers and SL RLC bearers associated with a remote UE (a plurality of mappings may be provided via multiple RRCReconfiguration messages), the relay UE can determine a SL RLC bearer used to forward a SDU, corresponding to an adaptation layer PDU received from gNB, to the remote UE based on a bearer ID and a local UE identifier of the remote UE included in the adaptation layer header. The bearer ID is an identity of the Uu radio bearer from which the data in the adaptation layer PDU comes. For UL transmission, the relay UE would be able to determine a bearer ID to be included in a header of an adaptation layer PDU to be transmitted to gNB when receiving a SDU from the remote UE: based on a SL RLC bearer on which the Service Data Unit (SDU) is received. According to the bearer ID, gNB can determine which Uu PDCP entity to pass the received SDU to. From an adaptation layer point of view, a PDU may comprise a SDU and a header.

In case the relay UE supports UE-to-Network relaying for multiple remote UEs, gNB may transmit another RRCReconfiguration message(s) to the relay UE to configure Uu radio bearer to SL RLC bearer mapping(s) for other remote UE(s).

Figure 12:
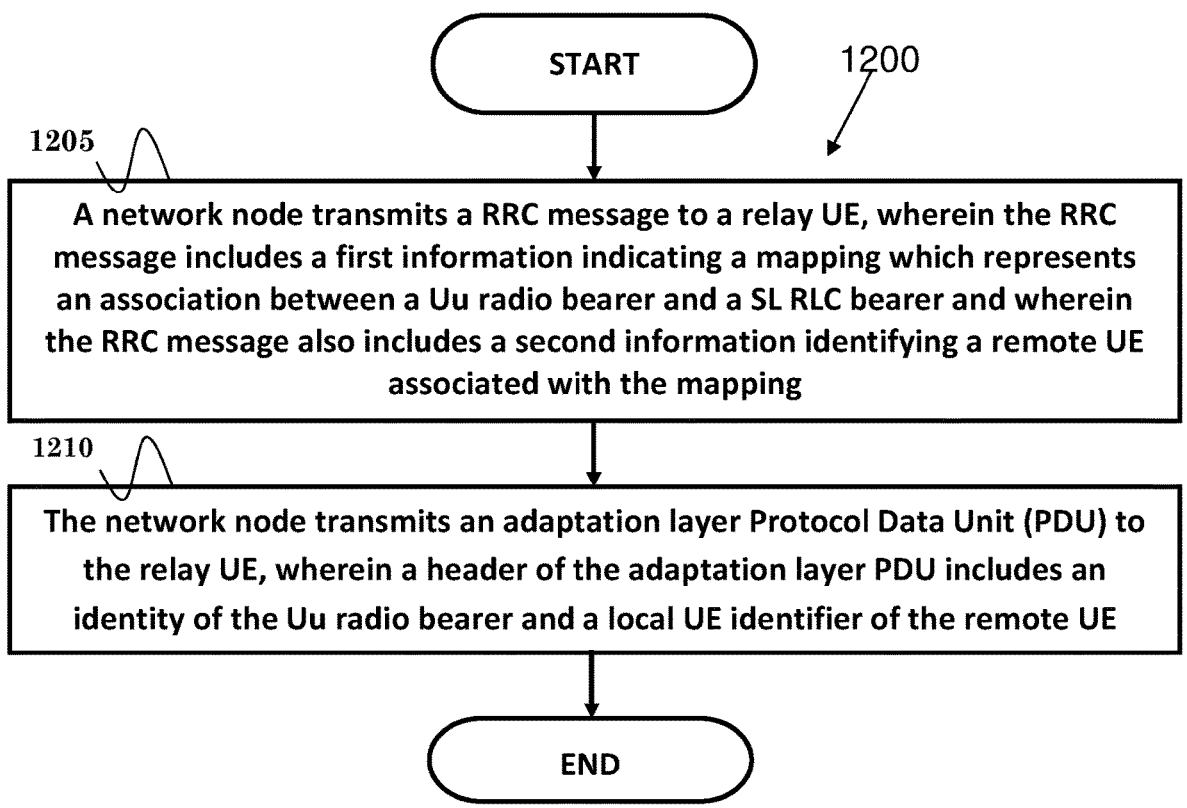
FIG. 12 is a flow chart according to one exemplary embodiment.

FIG. 12 is a flow chart 1200 according to one exemplary embodiment for Uu radio bearer to SL RLC bearer mapping from the perspective of a network node. In step 1205, a network node transmits a RRC message to a relay UE, wherein the RRC message includes a first information indicating a mapping which represents an association between a Uu radio bearer and a SL RLC bearer and wherein the RRC message also includes a second information identifying a remote UE associated with the mapping. In step 1210, the network node transmits an adaptation layer Protocol Data Unit (PDU) to the relay UE, wherein a header of the adaptation layer PDU includes an identity of the Uu radio bearer and a local UE identifier of the remote UE.

Referring back to FIGS. 3 and 4, in one exemplary embodiment of a network node for Uu radio bearer to SL RLC bearer mapping. The network node 300 includes a program code 312 stored in the memory 310. The CPU 308 could execute program code 312 to enable the network node (i) to transmit a RRC message to a relay UE, wherein the RRC message includes a first information indicating a mapping which represents an association between a Uu radio bearer and a SL RLC bearer and wherein the RRC message also includes a second information identifying a remote UE associated with the mapping, and (ii) to transmit an adaptation layer Protocol Data Unit (PDU) to the relay UE, wherein a header of the adaptation layer PDU includes an identity of the Uu radio bearer and a local UE identifier of the remote UE. Furthermore, the CPU 308 can execute the program code 312 to perform all of the above-described actions and steps or others described herein.

Figure 13:
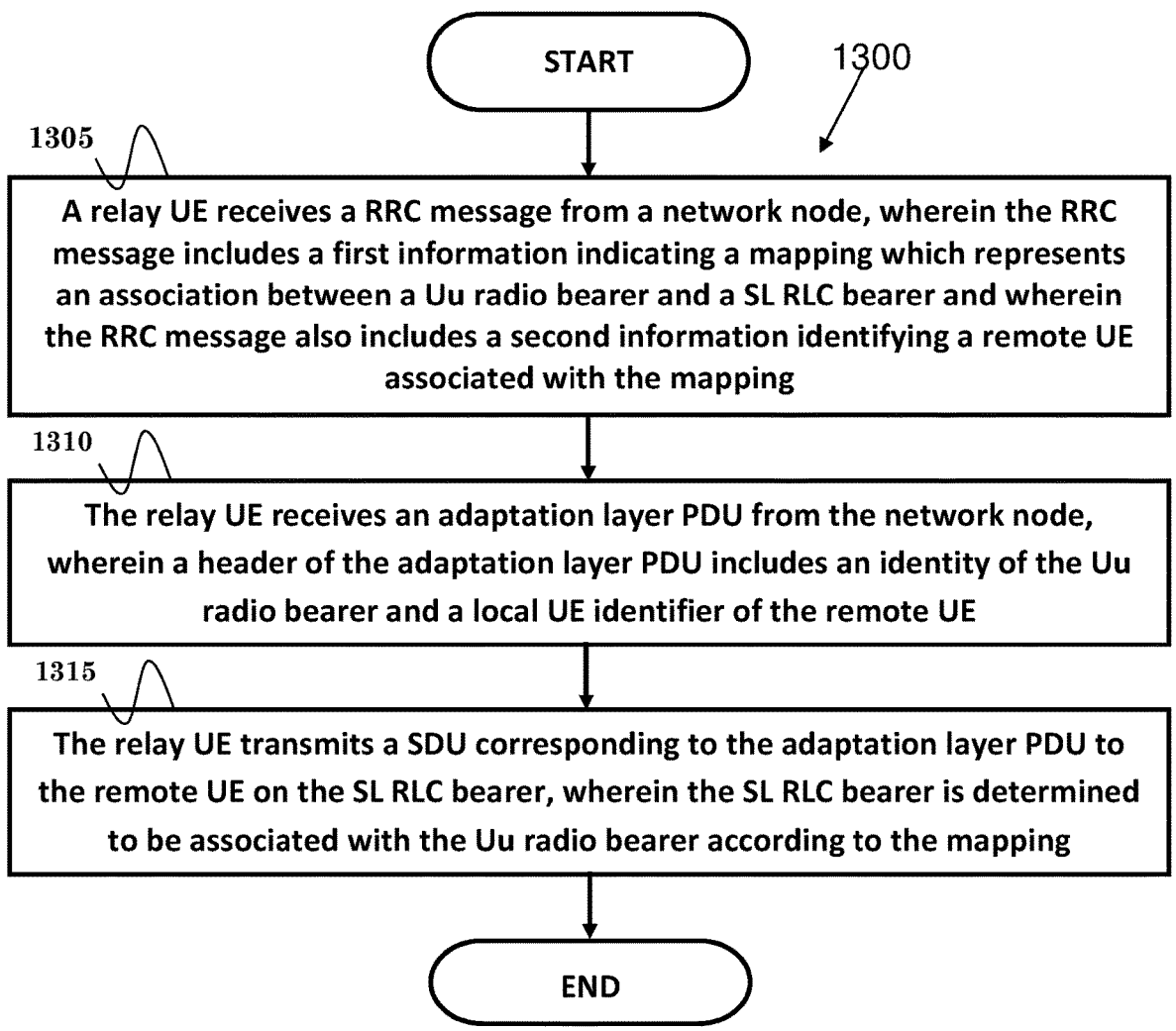
FIG. 13 is a flow chart according to one exemplary embodiment.

FIG. 13 is a flow chart 1300 according to one exemplary embodiment for Uu radio bearer to SL RLC bearer mapping from the perspective of a relay UE. In step 1305, a relay UE receives a RRC message from a network node, wherein the RRC message includes a first information indicating a mapping which represents an association between a Uu radio bearer and a SL RLC bearer and wherein the RRC message also includes a second information identifying a remote UE associated with the mapping. In step 1310, the relay UE receives an adaptation layer Protocol Data Unit (PDU) from the network node, wherein a header of the adaptation layer PDU includes an identity of the Uu radio bearer and a local UE identifier of the remote UE. In step 1315, the relay UE transmits a Service Data Unit (SDU) corresponding to the adaptation layer PDU to the remote UE on the SL RLC bearer, wherein the SL RLC bearer is determined to be associated with the Uu radio bearer according to the mapping.

Referring back to FIGS. 3 and 4, in one exemplary embodiment of a relay UE for Uu radio bearer to SL RLC bearer mappoint. The network node 300 includes a program code 312 stored in the memory 310. The CPU 308 could execute program code 312 to enable the relay UE (i) to receive a RRC message from a network node, wherein the RRC message includes a first information indicating a mapping which represents an association between a Uu radio bearer and a SL RLC bearer and wherein the RRC message also includes a second information identifying a remote UE associated with the mapping, (ii) to receive an adaptation layer PDU from the network node, wherein a header of the adaptation layer PDU includes an identity of the Uu radio bearer and a local UE identifier of the remote UE, and (iii) to transmit a SDU corresponding to the adaptation layer PDU to the remote UE on the SL RLC bearer, wherein the SL RLC bearer is determined to be associated with the Uu radio bearer according to the mapping. Furthermore, the CPU 308 can execute the program code 312 to perform all of the above-described actions and steps or others described herein.

In the context of the embodiments illustrated in FIGS. 12 and 13 and discussed above, a PC5 RRC connection or a unicast link could be established between the relay UE and the remote UE. The RRC message may include information indicating a SL RLC bearer configuration for the SL RLC bearer, a SL RLC bearer to Uu RLC bearer mapping, and/or a Uu RLC bearer configuration for the Uu RLC bearer. The identity of the Uu radio bearer may be included in the SL RLC bearer configuration for the SL RLC bearer. The SL RLC bearer configuration may include a SL RLC bearer identity or a logical channel identity (LCID) of the SL RLC bearer, and/or an index of the SL RLC bearer configuration.

In one embodiment, the RRC message may be a RRCReconfiguration. The Uu radio bearer could be identified by a Uu radio bearer identity, and/or the SL RLC bearer could be identified by a SL RLC bearer identity or a logical LCID. The adaptation layer may be above a Uu RLC layer. The second information identifying the remote UE may be the local UE identifier of the remote UE. The local UE identifier of the remote UE could be allocated or assigned by the relay UE or the network node. The Uu radio bearer may be a data radio bearer (DRB) or a signalling radio bearer (SRB).

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for Uu radio bearer to Sidelink (SL) Radio Link Control (RLC) bearer mapping, comprising:
a network node transmits a Radio Resource Control (RRC) message to a relay User Equipment (UE), wherein the RRC message transmitted by the network node to the relay UE includes a first information indicating a mapping which represents an association between a Uu radio bearer and a SL RLC bearer and wherein the RRC message transmitted by the network node to the relay UE also includes a second information identifying a remote UE associated with the mapping and a local UE identifier allocated for the remote UE; and
the network node transmits an adaptation layer Protocol Data Unit (PDU) to the relay UE, wherein a header of the adaptation layer PDU transmitted by the network node to the relay UE includes an identity of the Uu radio bearer and the local UE identifier for the remote UE transmitted by the network node to the relay UE as part of the RRC message.

2. The method of claim 1, wherein a PC5 RRC connection or a unicast link is established between the relay UE and the remote UE.

3. The method of claim 1, wherein the RRC message includes information indicating at least one of a SL RLC bearer configuration for the SL RLC bearer, a SL RLC bearer to Uu RLC bearer mapping, or a Uu RLC bearer configuration for the Uu RLC bearer.

4. The method of claim 1, wherein the Uu radio bearer is identified by the identity of the Uu radio bearer, and the SL RLC bearer is identified by a SL RLC bearer identity.

5. The method of claim 3, wherein the identity of the Uu radio bearer is included in the SL RLC bearer configuration for the SL RLC bearer.

6. The method of claim 3, wherein the SL RLC bearer configuration includes at least one of a SL RLC bearer identity, a logical channel identity (LCID) of the SL RLC bearer, or an index of the SL RLC bearer configuration.

7. The method of claim 1, wherein the adaptation layer is above a Uu RLC layer.

8. The method of claim 1, wherein the Uu radio bearer is identified by the identity of the Uu radio bearer, and the SL RLC bearer is identified by a logical channel identity (LCID).

9. The method of claim 1, wherein the local UE identifier of the remote UE is allocated or assigned by the relay UE or the network node.

10. A method for Uu radio bearer to Sidelink (SL) Radio Link Control (RLC) bearer mapping, comprising:
   a relay User Equipment (UE) receives a Radio Resource Control (RRC) message from a network node, wherein the RRC message received by the relay UE from the network node includes a first information indicating a mapping which represents an association between a Uu radio bearer and a SL RLC bearer and wherein the RRC message received by the relay UE from the network node also includes a second information identifying a remote UE associated with the mapping and a local UE identifier allocated for the remote UE;
   the relay UE receives an adaptation layer Protocol Data Unit (PDU) from the network node, wherein a header of the adaptation layer PDU received by the relay UE from the network node includes an identity of the Uu radio bearer and the local UE identifier for the remote UE received by the relay UE from the network node as part of the RRC message; and
   the relay UE transmits a Service Data Unit (SDU) corresponding to the adaptation layer PDU to the remote UE on the SL RLC bearer, wherein the SL RLC bearer is determined to be associated with the Uu radio bearer according to the mapping.

11. The method of claim 10, wherein a PC5 RRC connection or a unicast link is established between the relay UE and the remote UE.

12. The method of claim 10, wherein the RRC message includes information indicating at least one of a SL RLC bearer configuration for the SL RLC bearer, a SL RLC bearer to Uu RLC bearer mapping, or a Uu RLC bearer configuration for the Uu RLC bearer.

13. The method of claim 10, wherein the Uu radio bearer is identified by the identity of the Uu radio bearer, and the SL RLC bearer is identified by a SL RLC bearer identity.

14. The method of claim 12, wherein the identity of the Uu radio bearer is included in the SL RLC bearer configuration for the SL RLC bearer.

15. The method of claim 12, wherein the SL RLC bearer configuration includes at least one of a SL RLC bearer identity, a logical channel identity (LCID) of the SL RLC bearer, or an index of the SL RLC bearer configuration.

16. The method of claim 10, wherein the adaptation layer is above a Uu RLC layer.

17. The method of claim 10, wherein the Uu radio bearer is identified by the identity of the Uu radio bearer, and the SL RLC bearer is identified by a logical channel identity (LCID).

18. The method of claim 10, wherein the local UE identifier of the remote UE is allocated or assigned by the relay UE or the network node.

19. The method of claim 10, wherein the Uu radio bearer is a data radio bearer (DRB) or a signalling radio bearer (SRB).

20. A relay User Equipment (UE) for Uu radio bearer to Sidelink (SL) Radio Link Control (RLC) bearer mapping, comprising:
   a control circuit;
   a processor installed in the control circuit; and
   a memory installed in the control circuit and operatively coupled to the processor;
   wherein the processor is configured to execute a program code stored in the memory to:
      receive a Radio Resource Control (RRC) message from a network node, wherein the RRC message received by the relay UE from the network node includes a first information indicating a mapping which represents an association between a Uu radio bearer and a SL RLC bearer and wherein the RRC message received by the relay UE from the network node also includes a second information identifying a remote UE associated with the mapping and a local UE identifier allocated for the remote UE;
      receive an adaptation layer Protocol Data Unit (PDU) from the network node, wherein a header of the adaptation layer PDU received by the relay UE from the network node includes an identity of the Uu radio bearer and the local UE identifier for the remote UE received by the relay UE from the network node as part of the RRC message; and
      transmit a Service Data Unit (SDU) corresponding to the adaptation layer PDU to the remote UE on the SL RLC bearer, wherein the SL RLC bearer is determined to be associated with the Uu radio bearer according to the mapping.

* * * * *